Jan. 29, 1952     R. M. MERO     2,583,866
APPARATUS FOR VACUUMIZING, GASSING, AND
CLOSING CONTAINERS Filed Sept. 15, 1947     8 Sheets-Sheet 1

INVENTOR.
Ralph M. Mero
BY
Mason, Porter, Diller & Stewart
ATTYS.

Jan. 29, 1952     R. M. MERO     2,583,866
APPARATUS FOR VACUUMIZING, GASSING, AND
CLOSING CONTAINERS Filed Sept. 15, 1947                   8 Sheets-Sheet 4

INVENTOR.
Ralph M. Mero
BY Mason, Porter, Diller & Stewart
ATTYS.

Jan. 29, 1952 R. M. MERO 2,583,866
APPARATUS FOR VACUUMIZING, GASSING, AND
CLOSING CONTAINERS
Filed Sept. 15, 1947 8 Sheets-Sheet 5

INVENTOR.
Ralph M. Mero
BY
Mason, Porter, Diller & Stewart
ATTYS.

Patented Jan. 29, 1952

2,583,866

UNITED STATES PATENT OFFICE 2,583,866

APPARATUS FOR VACUUMIZING, GASSING, AND CLOSING CONTAINERS

Ralph M. Mero, Chicago, Ill., assignor to Continental Can Company, Inc., New York, N. Y., a corporation of New York Application September 15, 1947, Serial No. 774,074

18 Claims. (Cl. 226—82)

1

The invention relates generally to apparatus for vacuumizing, gassing and closing, or merely vacuumizing and closing containers, particularly those in which pulverulent materials of which coffee comprises an example are packaged for the market, and it primarily seeks to provide a novel apparatus capable of vacuumizing and gassing such containers rapidly and efficiently and without danger of drawing the material out of the containers or into position for interfering with the proper closing and sealing of said containers.

In the packaging of ground coffee in cans, two methods are well known and customarily are employed. According to one method an uncovered, filled can is placed in a sealed vacuumizing chamber, a vacuum is drawn in the can and chamber, and then a cover is placed upon and affixed to the can body to hermetically seal the same while it is confined in the vacuumized chamber. In some instances it may be desired to enclose an inert gas in the cans, and in such cases the gas is directed into the vacuumized chamber and the cans therein after they are vacuumized and before the cans are hermetically sealed as aforesaid. In practicing the other of said methods a cover is loosely clinched on each filled can before it is placed in the sealed chamber, the can with its loosely clinched cover is placed in the sealed chamber and the desired vacuum is drawn in the chamber and can, and then the clinched cover is hermetically sealed on the can in the vacuumized chamber. As in the first mentioned method, when it is desired to enclose an inert gas in such cans, the gas is directed into the vacuumized chamber and is drawn into the cans after the cans are vacuumized and before they are hermetically sealed.

The above mentioned methods and other methods of vacuum packing coffee are practiced because it is well known that air within the packaging containers has a deleterious effect on the coffee during storage of the containers prior to sale on the market. In the packaging of coffee in vacuo it is highly desirable that the cans be sealed in a vacuum of 29 inches or over, and it is essential that no air be permitted to enter the cans after they have been sealed, such as would occur should faulty or leaky seams be formed in the sealing of the cans.

Vacuumizing, gassing and closing machines have been provided heretofore adapted to practice packaging methods such as are referred to hereinabove, but conventional machine structures have not been entirely satisfactory for various reasons.

2

It is well known that when an unsealed can of ground coffee, with or without a loosely applied cover, is placed in a sealed chamber and subjected to a vacuum, the air in the can expands causing the expanding air to rush past the particles of coffee as it leaves through the open or unsealed top of the can.

In both of the previously mentioned methods, if the velocity of the air leaving a can during evacuation is too rapid, it will draw the fine particles of coffee from the can, and, in the first method, leaves a deposit of fine grounds on the can flange where they will become lodged in the seam structure when the cover is applied and seam sealed on the can body. In the second method, in which the cover is loosely applied and clinched on the can body, the fine particles of coffee will be drawn into and become lodged in the clearance between the cover and can flange, thereby interfering with the formation of a satisfactory seam. Obviously this lodging of coffee in the seam structure may result in the formation of minute seam leaks through which air may slowly leak into the cans upon storage, with deleterious effect.

In addition to the above mentioned objections, it has been found that when the coffee fines are drawn from the cans during vacuumization, they eventually collect around the mechanical parts of the cover seaming or closing apparatus enclosed in the vacuum chamber causing mechanical and lubricating difficulties. These fines also become lodged in the vacuum line and vacuum pump causing the pump to operate inefficiently and creating mechanical difficulties and interruptions in operation. Moreover, the incidental loss of coffee during a day's run is substantial and constitutes an economic factor.

It is a purpose of the present invention to provide a novel apparatus in which filled cans of pulverulent material such as coffee may be vacuumized rapidly and efficiently without encountering any of the difficulties hereinabove mentioned.

It has been found that in order to eliminate the objectionable conditions previously mentioned, it is necessary that in the process of evacuating the air from the coffee filled cans the "drag" on the coffee shall be at all times insufficient to lift the finest particles of coffee in the can. The term "drag" refers to the lifting force of the air in the can acting upon the particles of coffee and which is created by the movement of the air past these particles as the air rushes out of the can. This drag is a function of the velocity and density of the air, the cross sectional area of the particle transverse to the direction of motion of the air and the friction between the particle and the air. In order that the moving air contacting a particle of coffee will not lift the coffee vertically, the drag force must always be less than the weight of the coffee particle.

For a given size can and coarseness of grind of a selected grade of coffee, the weight and surface area of the particles of coffee opposing the drag of the outrushing air is substantially constant for each can. Therefore, it has been found that in order to withdraw air from a can of ground coffee at a maximum rate with respect to time, it is necessary to maintain at all times a constant drag on the coffee just below that which would be effective to lift the coffee fines. When an unsealed can of coffee is placed in a sealed chamber and vacuumized at a rate insufficient to lift the coffee fines from the can, the air must be permitted to escape from the chamber at such a rate that the drag on each particle of coffee is less than the weight of the particle. For a given set of conditions, the drag is primarily a function of the density and velocity of the air, and so, as the air becomes more and more rarified as the vacuumizing process progresses, its density decreases, permitting the velocity of the air rushing out of the can to be increased without increasing the drag force tending to lift the coffee particles out of the can.

Efforts have been made heretofore to provide for a progressive increase of the vacuum during the vacuumizing of cans of pulverulent material, as by the employment of several evacuating ports of progressively increased sizes with which the chambers in which the individual cans are vacuumized are serially brought into communication, or by the provision of a continuous slot of gradually increased cross section through which the evacuation is effected and along which are moved the individual uniform size communicating ports of the multiple of vacuumizing chambers, but such apparatus has not been found entirely satisfactory. The successively and individually communicating evacuating ports do not provide the desired smooth and constantly increasing velocity of the outrushing air or the constant drag required to accomplish rapid evacuation with drawing off of pulverulent material, but rather a stepped or pulsating effect in the drawing off of the air. In the second mentioned apparatus several chambers are being simultaneously evacuated through the same tapered slot, the amount of taper controlling the rate of evacuation. Since the several chambers are connected simultaneously and in succession to the tapered slot leading to the evacuating pump, each time a new oncoming chamber communicates with the slot there will be a sudden additional supply of air from the newly connected chamber, which will rush into the slot, which air momentarily reduces the former vacuum existing in the slot. This momentary high pressure in the slot will cause the air in the slot to flow into all the other chambers then connecting with the slot whose vacuum is then lower than that in the slot. This causes the gradual flow of air coming from the more advanced chambers to be momentarily arrested or reversed, thereby creating a pulsation within the chamber and can sufficient to lift the coffee fines in the can even in chambers that have reached a high stage of evacuation. Thus, a longer time interval is required to evacuate the chamber and can to the desired degree and the pulsation of pressure or vacuum in the slot does not permit attainment of the desired high vacuum during the last and final period of evacuation.

It is a purpose of the present invention to provide a novel apparatus for evacuating filled cans of pulverulent material rapidly and efficiently and in which the can enclosing chambers are evacuated individually and without any objectionable inter-communication of the chambers or interference of the outrushing air in the evacuating ducts or passages, and in which the desired smooth and constantly increasing velocity of the outrushing air is obtained with an attendant constant drag on the coffee in the cans always insufficient to lift particles of coffee from said cans.

Another object of the invention is to provide an apparatus of the character stated which is readily adaptable for vacuumizing and closing cans in the manner stated, or for vacuumizing the cans in the manner stated, introducing an inert gas into the cans after they are vacuumized, and then closing the vacuumized and gassed cans.

Another object of the invention is to provide an apparatus of the character stated in which the coffee filled cans are vacuumized in a valve-like structure including a casing and a peripherally pocketed or chambered rotor, there being included valve means for controlling the vacuumization and comprising a port connected through a duct with each chamber and disposed to move with the rotor and traverse orifices opening into a chamber connected with the vacuum source, said orifices being arranged in an arc and of gradually and successively increasing diameter and so related to each other and said ports that there is continuous communication during the vacuumizing process between each chamber and the vacuum source, without any interruption or blocking of said communication, and controlled by the orifice sizes their number and spacing so as to assure that the desired constant drag on the coffee is maintained always just below an amount sufficient to lift particles of coffee from the cans.

Another object of the invention is to provide an apparatus of the character stated in which the orifices of successively increasing diameter are arranged in two concentrically disposed rows with the orifices in staggered relation so that an orifice is one row will lie centered with respect to two orifices in the other row and so related to the chamber or pocket communicating ports that each port, at all times when it is traversing the orifices, will communicate over the full areas of two orifices, covering two whole orifices or one whole orifice and portions of two orifices which combined with said one orifice will total two full orifice areas.

Another object of the invention is to provide an apparatus of the character stated in which the valve-like structure in which the filled coffee cans are vacuumized includes a casing separate and apart from the casing in which the can closing devices are mounted, provision being made for feeding the cans into the valve-like structure to be vacuumized therein, thence into the closing device housing casing to be closed therein, thence out of the last mentioned casing back into the valve-like structure to be finally discharged therefrom.

Another object of the invention is to provide a closing machine and valve-like structure combination of the character stated in which the respective casings abut at the position of registering openings through which the cans pass between casings, said openings being surrounded by sealing gasket means, the valve-like structure being movable away from its sealed contact with the closing apparatus casing to provide access between the casings, and there being included means for moving the valve-like structure to and from its contact with the closing apparatus casing without disrupting the various driving connections of the apparatus.

Another object of the invention is to provide a vacuumizing apparatus of the character stated in which the valve-like structure rotor is frustoconical in shape with its pockets or chambers arranged about its periphery intermediately of the top and bottom thereof, and there being included sealing ring means extending about the whole of the rotor between the same and its casing, both above and below the peripheral pockets.

Another oject of the invention is to provide a valve-like structure of the character stated in which the sealing ring means are mounted in the rotor and comprise split ring sections with sealing shoes backing up and sealing the splits in the rings.

Another object of the invention is to provide a vacuumizing and closing apparatus of the character stated in which there is included a vacuum chamber communicating with the vacuum source and forming a part of the vacuumizing devices, means for affording communication between said chamber and the interior of the closing apparatus, means optionally permitting or preventing said communication, and means for optionally introducing an inert gas under pressure into said closing apparatus, thereby to permit operation of the apparatus as a whole for vacuumizing only, or for both vacuumizing and gassing the filled cans.

Another object of the invention is to provide an optional vacuumizing, or vacuumizing and gassing apparatus of the character stated in which there is included a gassing duct communicating with the closing apparatus and provided with multiple delivery ducts disposed to direct gas into the rotor chambers or pockets in which the filled cans are vacuumized before said chambers or pockets open into the closing apparatus.

Another object of the invention is to provide in an apparatus of the character described screening means associated with each of the vacuumizing chambers and effective to catch any pulverulent material which might be withdrawn from cans in the chamber during any faulty conditions of operation, thereby to prevent ingress of such material into working parts of the apparatus, and also novel means for directing air under pressure against said screening means in a manner for keeping them clean and preventing clogging thereof.

Another object of the invention is to provide in a vacuumizing apparatus of the character stated a novel means for testing the vacuum being drawn in any selected individual vacuumizing chamber or pocket, said means including an annular tester groove common to all vacuumizing chambers or pockets, a gage connection with said groove, and an individual valve means associated with each chamber or pocket for selectively connecting said chambers or pockets with said gage connection.

Another object of the invention is to provide in a vacuumizing apparatus of the character stated a novel orifice plate in which the graduated orifices are arranged in an arc, and a novel arrangement of vacuum chambers associated with the orifices in the plate and with individual vacuum sources in a manner for performing the desired vacuumizing of the filled cans rapidly in two vacuum stages, namely, low and high vacuum.

With the above and other objects in view that will hereinafter appear, the nature of the invention will be more clearly understood by reference to the following detailed description, the appended claims and the several views illustrated in the accompanying drawings.

Figures 19, 20:
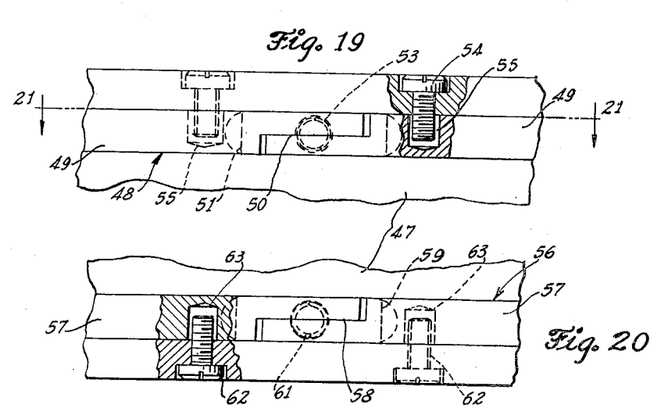
Figure 21:
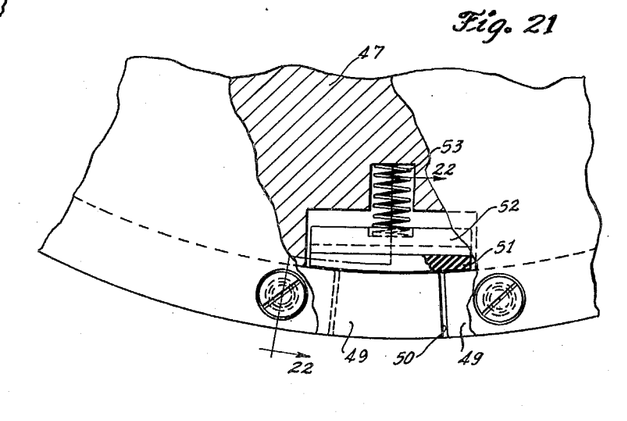
Figure 22:
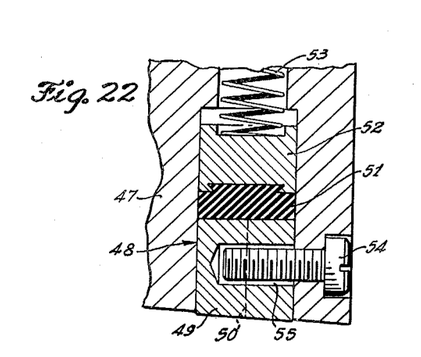
Figure 23:
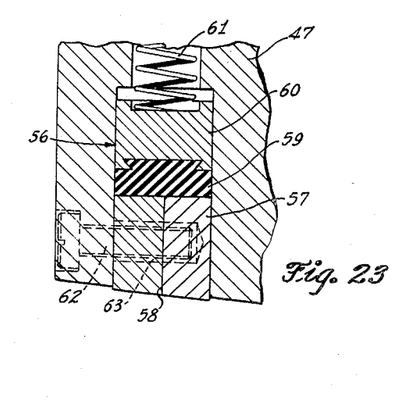

A rotor 47 is keyed on the column 27 and has a frusto-coniform periphery which rotates within the rotor chamber 22. Near its upper end the rotor is provided with an annular sealing ring groove, and within said groove sealing ring sections 49 are mounted in the manner clearly illustrated in Figures 1, 19 and 22. The multiple ring sections are split and lapped as at 50, and each split lap is backed and sealed by a neoprene shoe carried by a metal follower. Compression springs 53 serve to constantly press the sealing shoes 51 in sealing contact over the split lap portions of the ring sections, thereby to provide for a very efficient seal between the rotor and casing at the position of the ring equipment. Screws 54 engaging in enlarged sockets in the ring sections hold the ring sections in place with suitable floating freedom. A similar annular groove 56 is provided near the bottom of the rotor, and this groove also receives ring sections 57 which are split and lapped at 58, the split laps being backed up by neoprene shoes 59 carried by metal followers 60 constantly urged against the ring sections by follower springs 61. Screws 62 engaging in sockets 63 in the ring sections hold the ring sections in place in the manner previously described.

Figures 1, 7:
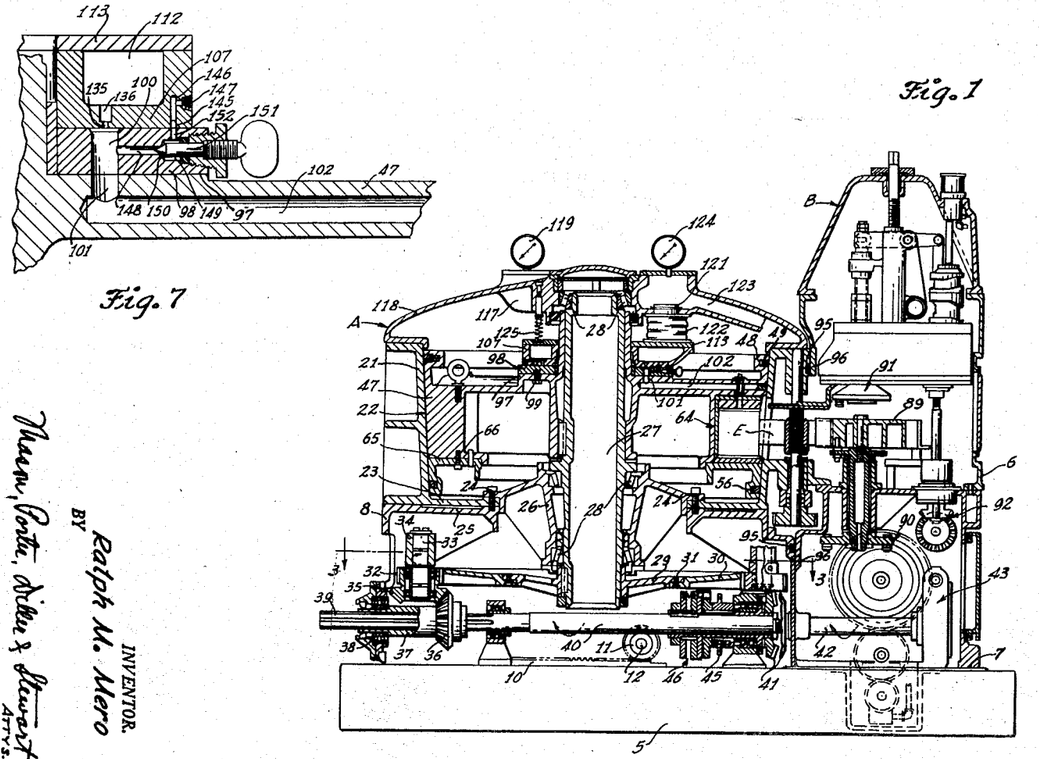
Figure 1 is a vertical longitudinal section through an apparatus embodying the invention, the section being taken on the line 1—1 of Figure 2.
Figure 7 is an enlarged fragmentary vertical cross section illustrating the tester groove, the gage duct and one of the selective tester valves.
Figure 12:
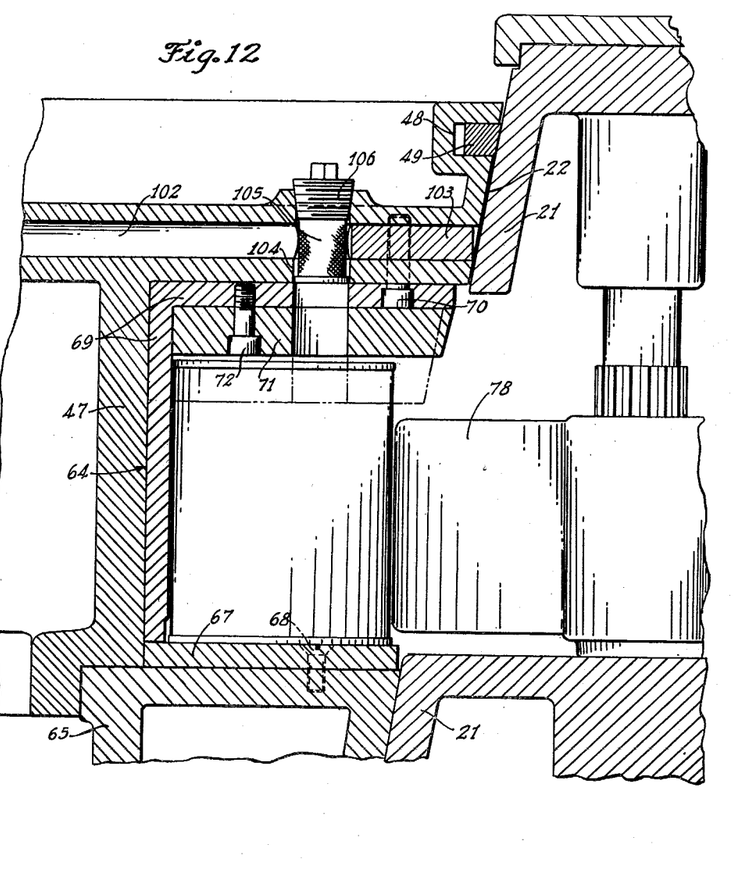
Figure 12 is an enlarged fragmentary vertical cross section taken through one of the vacuumizing chambers or pockets and its duct screening means.

Peripheral pockets or chambers 64 are formed in equidistantly spaced relation about the periphery of the rotor, and in order to facilitate the formation and preparation of said pockets or chambers it may be desirable to provide the rotor section with a removable bottom 65, secured as at 66 to the top or main rotor section in the manner clearly illustrated in Figure 1. By reference to Figures 1 and 12 of the drawings it will be observed that each chamber or pocket 64 may be provided with a removable base or bottom 67 removably secured to the rotor as at 68, an adapter wall 69 removably secured as at 70 to said rotor, and a filler or ceiling piece 71 removably secured as at 72 to the top of the adapter wall member 69. By proper selection and arrangement of the adapter pieces 67, 69 and 71, the sizes of the vacuumizing pockets or chambers 64 may be varied so as to provide the desired minimum of free space surrounding the cans being vacuumized in the rotor. It is to be understood, of course, that the herein disclosed apparatus is adaptable to use in the vacuumizing of cans of various sizes.

Figures 3, 4, 8:
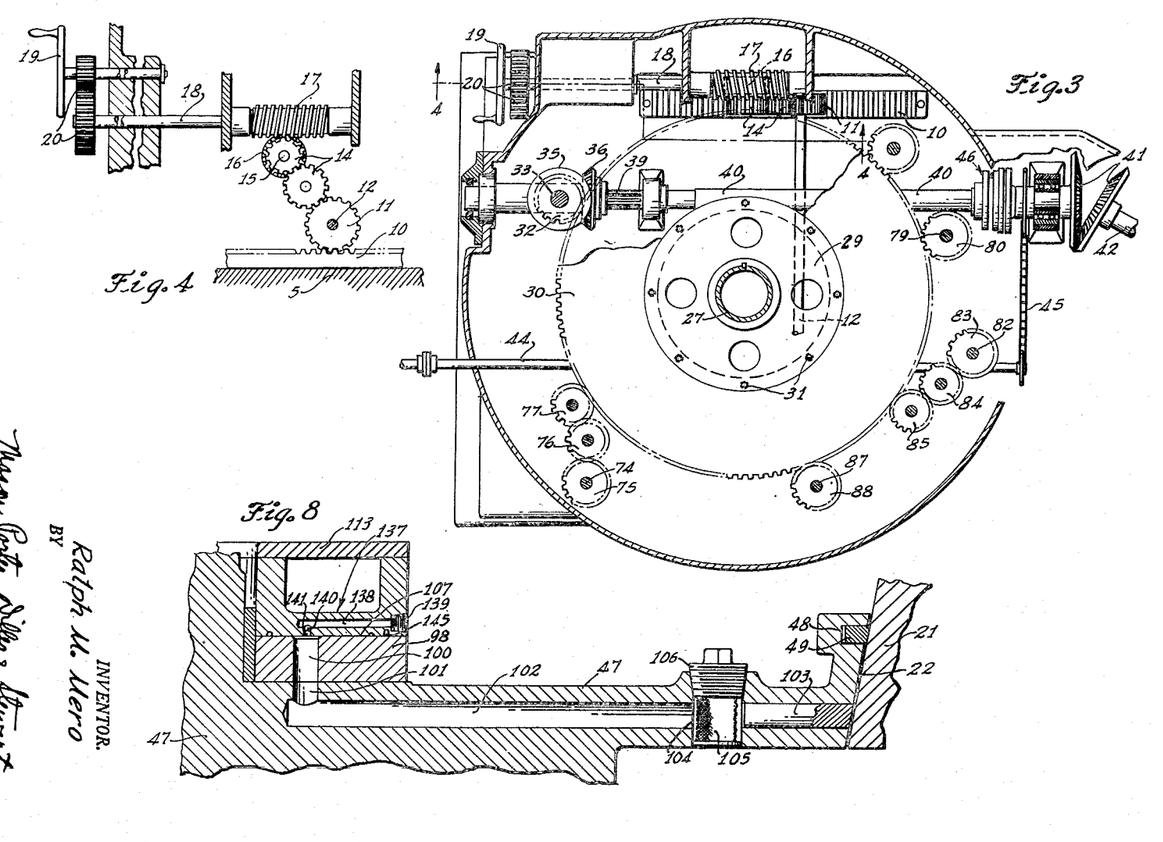
Figure 3 is a horizontal sectional view taken through the valve-like vacuumizing apparatus, the section being taken on the line 3—3 on Figure 1.
Figure 4 is a fragmentary vertical longitudinal section illustrating the means for shifting the valve-like vacuumizing apparatus to and from its operative position in sealed contact against the closing apparatus, the section being taken on the line 4—4 on Figure 3.
Figure 8 is an enlarged fragmentary cross sectional view illustrating one of the vacuumizing duct screening means and the means for directing cleaning air against said screening means.

The transfer device generally designated D and which is effective to transfer filled cans from the feed-in devices C into the pockets or chambers 64 of the rotor in the vacuumizing apparatus A, includes a transfer star 73 secured upon the upper end of a vertical shaft 74 having a gear 75 secured thereon to which rotation is imparted through an intermediate idler gear 76 from a pinion 77 which is in turn driven by the ring gear 30 in the manner clearly illustrated in Figure 3.

The transfer means generally designated E and which is effective to remove vacuumized cans from the rotor pockets 64 and transfer them into the closing apparatus B includes a transfer star 78 secured on the upper end of a vertical shaft 79 having a pinion 80 fixed thereon to which rotation is imparted by the ring gear 30 in the manner illustrated in Figure 3.

The transfer means F by which the closed cans are delivered from the closing apparatus back into the rotor pockets 64 of the vacuumizing apparatus A includes a transfer star 81 on the upper end of a vertical shaft 82 having a gear 83 fixed thereon to which rotation is imparted through an intermediate idler gear 84 driven by a pinion 85 which meshes with the ring gear 30.

The transfer means G by which the closed cans are removed from the pockets of the vacuumizing apparatus rotor and placed on the feed-away devices H includes a transfer star 86 secured upon the upper end of a vertical shaft 87 having a gear 88 secured thereon to which rotation is imparted by the ring gear 30.

The previously mentioned transfer stars 78 and 81 feed the cans into and from the peripheral pockets of the turret 89 which is mounted in the closing apparatus beneath the closing devices and to which proper indexing movements are imparted by drive devices generally designated 90 and mounted within the closing apparatus casing 6 in the manner clearly illustrated in Figure 1. The turret 89 cooperates with any approved closing mechanism generally designated 91 and preferably an accepted mechanism by which the closing of the cans is effected by a double seaming operation, and the closing devices may be driven in the usual manner through driving devices generally designated 92 and which are in turn operated from a power source not shown. Closing devices and driving means therefor being well known in the art, it is considered unnecessary to describe these structures in detail herein.

The transfer stars 73 and 86 feed the cans into and from the pockets of the rotor of the vacuumizing apparatus A through a casing opening 93, and the transfer stars 78 and 81 feed the vacuumized cans from the rotor pockets into the pockets of the turret 89, and from the pockets of said turret back into the rotor pockets through the casing opening 94. The casing opening 94 is surrounded by a sealing gasket 95 which is engageable in sealing contact with a wall 96 of the closing apparatus casing 6, said wall surrounding an opening of the casing 6 which registers with the previously mentioned vacuumizing apparatus casing opening 94. Whenever the vacuumizing apparatus A is moved from its out-of-the-way position illustrated in dot and dash lines in Figure 1 to the operative position illustrated in full lines in Figures 1 and 2, the sealing gasket 95 will effect a seal between the casing of the vacuumizing apparatus and the closing apparatus so that no leakage of air is possible between the engaging surfaces of the apparatus casings at the openings through which cans are transferred between said casings.

Figure 14:
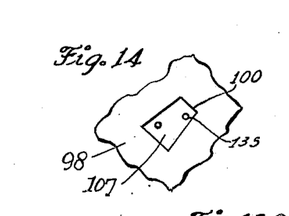
Figure 14 is an enlarged fragmentary view paratus over the feeding devices generally designated C and D in Figure 2.
Figure 15:
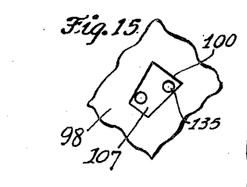
Figure 16:
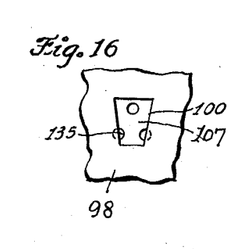
Figure 17:
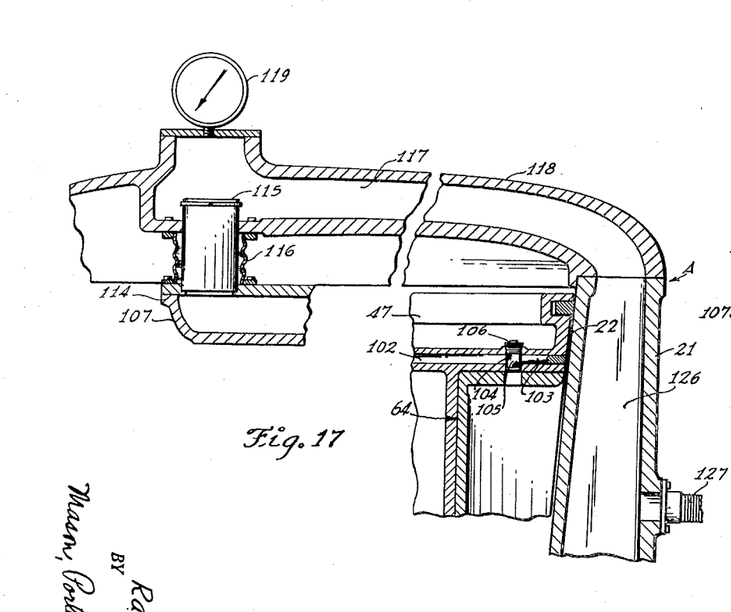
Figure 18:
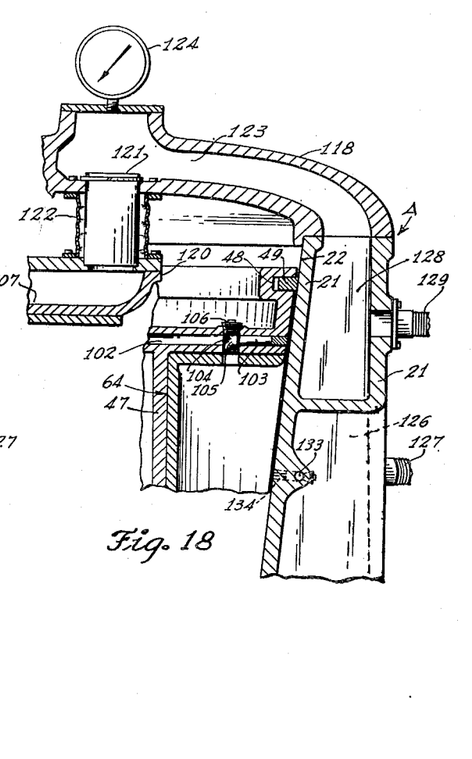

The rotor 47 of the vacuumizing apparatus is equipped with a center boss or shelf 97 whereon rests a valve plate 98, the arrangement of the plate being best illustrated in Figures 1, 7 and 8 of the drawings. The plate 98 is secured to the shelf 97 by a suitable number of securing screws 99. The plate 98 is provided with a multiple of ports 100 arranged in the form of a circle extending concentrically about the axis of the rotor, one such port being provided for each of the peripheral pockets or chambers 64 formed in the rotor. While the ports 100 may be otherwise shaped, they are herein disclosed as generally rectangular with radial sides and of uniform size and shape as illustrated in Figures 14 through 16 of the drawings. The ports 100 extend uprightly through the plate 98 and each registers over the upright end portion 101 of a radial vacuumizing duct 102 which extends over one of the rotor pockets 64 and is plugged at its outer end as at 103. Where it extends over the respective rotor pocket 64, each vacuumizing duct 102 is traversed by a vertical, tapped bore 104 opening downwardly into the interior of the respective pocket in the manner clearly illustrated in Figures 1, 8 and 12 of the drawings. A hollow screen unit 105 is mounted in each bore 104. The cylindrical screens prevent the passage of coffee fines or other pulverulent material upwardly out of the pockets and into the vacuumizing ducts 102, and each said screen unit depends from a threadably mounted plug 106 so as to be readily removable from the rotor. Means is provided for cleaning these screens of any collection of coffee fines or other pulverulent material which may result from faulty operation of the apparatus for any cause and this means will be described hereinafter.

Figure 10:
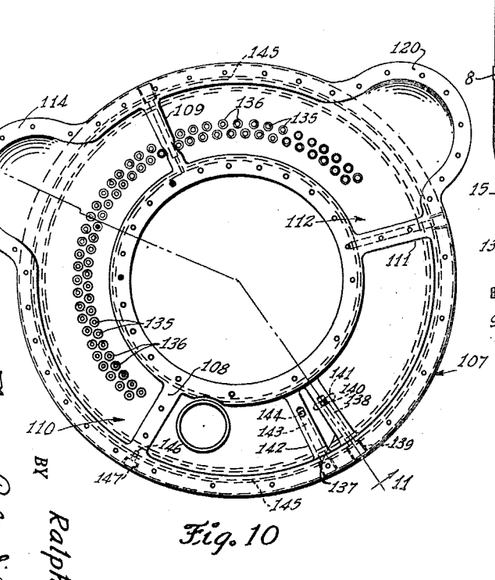
Figure 10 is a detail plan view illustrating the orifice plate, an arrangement of orifices effective for two stage vacuumizing being illustrated.
Figure 11:
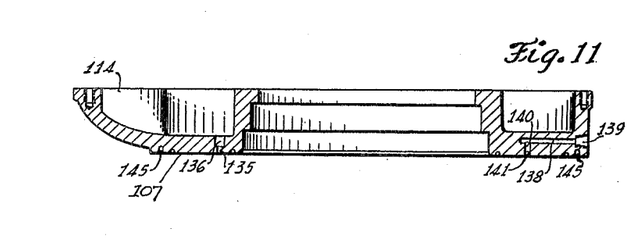
Figure 11 is a vertical cross section taken through the orifice plate on the line 11—11 on Figure 10.

An orifice plate 107 rests upon the valve plate in the manner clearly illustrated in Figures 1, 7 and 8, and said plate is constructed in the manner best illustrated in Figures 10 and 11. It will be noted that the orifice plate includes a flat bottom annulus which snugly engages the upper surface of the valve plate 98, and upstanding side portions are included which provide annular chambers. A radial partition wall 108 cooperates with the sides of the orifice plate structure and the radial partition wall 109 in defining an arcuate low vacuum chamber 110, and the radial wall 109 and a similar wall 111 cooperate in defining an arcuate high vacuum chamber 112. The isolated low and high vacuum chambers 110 and 112 are closed by a cover plate or ring 113 which is secured over the top of the orifice plate. The cover plate 113 is removed from the orifice plate in Figures 10 and 11.

It will be apparent by reference to Figure 10 that the orifice plate is provided with an enlargement 114 at the low vacuum side, and said enlargement connects through the slide tube 115 surrounded by the sealed Sylphon bellows 116 with a low vacuum duct 117 formed in the casing cover 118 and equipped with a suitable gage 119. The orifice plate also is equipped with an enlargement 120 at the high vacuum side and this connects through the slide tube 121 surrounded by the sealed Sylphon bellows 122 with the high vacuum duct 123 formed in the casing cover 118, said high vacuum duct also being provided with a suitable gage 124. Spring means 125 constantly urges the orifice plate assembly into tight seal contact against the top surface of the valve plate 98 in the manner clearly illustrated in Figures 1, 7 and 8, and by reason of the provision of the Sylphon bellows 116 and 122 sealed by soldering or the like at their lower and upper ends to the orifice plate cover and the casing cover respectively, any slight floating movement of which the orifice plate might partake will not result in any leakage about the tube connections 115 and 121.

It will be apparent by reference to Figures 1, 2, 5, 6, 17 and 18 that the low vacuum duct 117 connects with a low vacuum chamber 126 formed in the casing of the vacuumizing apparatus, and said chamber in turn connects through the duct 127 with the low vacuum source pump (not shown). The high vacuum duct 123 connects with a high vacuum chamber 128 formed in the casing of the vacuumizing apparatus, and the chamber 128 in turn connects through the duct 129 with the high vacuum source pump (not shown). The apparatus herein disclosed is designed for optional use either as a vacuumizing and closing means or a means for vacuumizing, gassing and closing, and for this reason there is also provided an inert gas duct 130 disposed to direct an inert gas under pressure directly into the closing apparatus casing 6, when desired, in the manner clearly illustrated in Figures 2 and 6 of the drawings. The wall 131 which separates the high vacuum chamber 128 from the interior of the closing apparatus casing 6 is provided with removable plugs 132. It is to be understood that the plugs 132 will be removed whenever the apparatus is to be used solely for vacuumizing and closing cans, thereby to enable the drawing of a high vacuum within the casing 6 of the closing apparatus. Whenever it is intended that an inert gas be directed into the vacuumized cans prior to the closing thereof, the plugs 132 will be mounted in the manner illustrated in Figures 5 and 6, and the inert gas will be introduced into the closing apparatus casing 6 through the duct 130 in the manner previously described. The vacuumizing apparatus casing is provided with a gas duct 133 adjacent the transfer opening 94, and this duct is best illustrated in Figures 2, 5, 13 and 18 of the drawings. The duct includes two radially inwardly extending portions 134 which open into the rotor chamber of the casing of the vacuumizing apparatus in such relation that both thereof will direct gas into a single rotor pocket 64 as it is approaching the casing opening 93 in the manner illustrated in Figure 13.

The bottom of the orifice plate 107 is pierced by two concentric rows of staggered orifices 135 of gradually and progressively increased diameters, and each orifice opens into a counterbore 136 in the manner clearly illustrated in Figures 7, 10 and 11. The counterbores are all of the same size, but as previously stated, the orifices 135 are very accurately formed with sharp upper and lower edges and of gradually and progressively increasing diameters throughout that portion of the first or second stage vacuumizing arcs over which the first or second stage of vacuumizing progresses from minimum to maximum. The diameters of the orifices 135 may be held constant in the respective illustration after the maximum vacuum of the particular stage has been attained if desired. It is to be understood also that the arrangement of ports illustrated in Figure 10 is but an example arrangement, and the size and number of the orifices may vary according to the nature of the pulverulent material packaged in the cans and the possible variation in the sizes of cans being vacuumized. It will be obvious that various materials differ in fineness and weight, and in working with various materials, a different, properly selected series of orifices is required for each substantial variation of material fineness. As finer pulverulent materials are packaged the orifice will be reduced in initial size gradually and accurately in order to suitably retard the rate of evacuation and prevent drawing of the material out of the cans.

In the development of multi-orifice valves, for evacuating the air in the shortest possible time without drawing off pulverulent material in the manner herein described, the maximum rate of evacuation possible without drawing the material out of the can must be determined. This is done by finding by experimentation the area of the largest orifice which can be used for evacuating air from the particular chamber or pocket holding the particular size of can and the particular pulverulent material, without lifting any of said material from the can when one side of the orifice is connected to a source of high vacuum. Having determined the largest constant size orifice in the manner stated, the desired multi-orifice valve with properly graduated orifices progressively increasing in size from the experimentally determined initial size orifice can be computed by mathematical formula. The arrangement of the orifices in the manner illustrated in Figures 10 and 13 in two concentric arcs with the orifices in staggered relation so that an orifice in one arc will be centered with respect to two orifices in the other arc, and with the traversing ports 100 arranged in the manner illustrated, especially in Figures 14, 15 and 16, it is possible to materially reduce the overall diameter of the multi-orifice valve and the gross diameter of the successively increasing orifice sizes. In this manner, the area of the initial or basic orifice is halved and each of the ports 100 always communicates with the complete areas of two orifices or the equivalent thereof, as shown in said Figures 14 to 16. An arrangement of orifices suitable for vacuumizing only is shown in Figure 10, and in Figure 13 an arrangement of orifices suitable for vacuumizing and gassing is shown, and in this case the arc of orifices terminates ahead of the end of the arc in Figure 10 so as to discontinue the vacuumizing of a given pocket before said pocket comes opposite the duct 133 and its radial portions 134.

Attention is directed to Figures 8 and 10 from which it will be apparent that the orifice plate may be provided with a radial wall 137 equipped with a radial duct 138 opening through the periphery of the plate in a threaded tap 139. The duct 138 has a downwardly extending portion 140 at its inner end which opens into an elongated bottom surface duct 141. It will be apparent that each time the duct equipment 137, 140, 141 is traversed by one of the vacuumizing ducts 102, 101 and the associated port 100, the respective screen 105 will be subjected to a blast of air at atmospheric pressure, said blast resulting from the fact that the associated pocket 64 is still under vacuum and being effective to remove from the screen any pulverulent material which may have collected thereagainst.

If desired, a second radial wall 142 may be formed on the orifice plate adjacent the above-mentioned wall 137, and this may be equipped with a similar radial air duct 143 opening through the periphery of the plate in a threaded tap. The duct 143 includes a downwardly extending portion 144 disposed to be traversed by the ports 100 for subjecting the screens 105 to a second blast of air. While it has been found that the admission of air at atmospheric pressure is sufficient to properly clean the screens of any collection of pulverulent material resulting from some faulty operation of the apparatus, the air ducts 138 and 143 may be connected with a suitable source of air under greater than atmospheric pressure.

Novel means are provided for testing the vacuum being drawn in any selected one of the rotor pockets 64. This means is best illustrated in Figures 1 and 7 of the drawings. To this end, the orifice plate is provided with an annular tester groove 145 which connects through a duct 146 with a threaded tap 147 opening through the periphery of the orifice plate. Associated with each valve plate port 100 is a radial tester duct 148 which opens into a chamber 149 through a valve seat 150, the latter being engageable by a threadably mounted needle valve for normally closing communication between the respective vacuumizing duct 102, port 100, tester duct 148, chamber 149 and the uprightly extending duct 152 which connects each chamber with the tester groove 145. A tester gage, preferably of the recording type, may be mounted in the threaded tap 147, and it will be apparent that when it is desired to test the operating condition in any selected rotor port 64, it is only necessary to back off the needle valve 151 associated with that particular pocket, thereby making it possible to test the operating condition in the pocket by the gage, and through the communicating duct 146, groove 145, duct 152, chamber 149, duct 148, port 100 and duct 102. The annular groove 145 being common to all of the tester ducts in the rotor and valve plate it is necessary to provide only one tester gage in order to test all of the pockets individually and selectively.

Figures 2, 6:
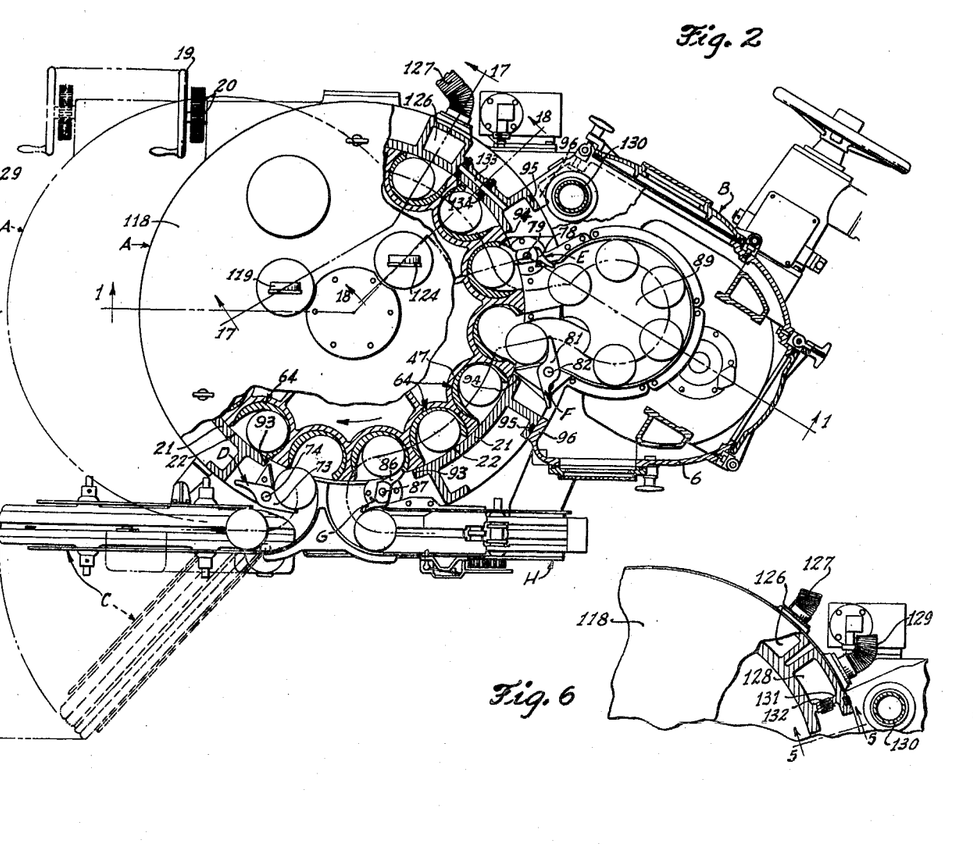
Figure 2 is a plan view and part horizontal section illustrating the apparatus shown in Figure 1, the valve-like vacuumizing apparatus being shown as shifted to its position away from the closing apparatus in dot and dash lines, and the means for feeding cans into the valve-like apparatus being shown as swung to an out-of-the-way position in dotted lines.
Figure 6 is a fragmentary plan view and in part horizontal section illustrating the parts shown in Figure 5 and also the gas duct leading into the closing apparatus.
Figure 5:
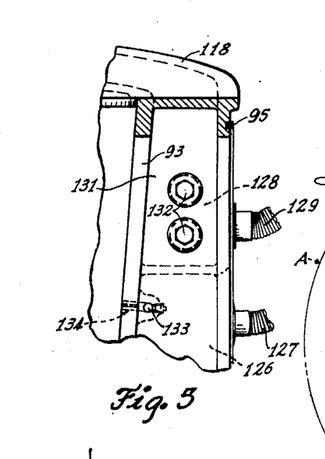
Figure 5 is a fragmentary vertical cross sectional view illustrating the high and low vacuum connections, the gassing duct and the optionally mounted closure plugs which open communication between the high vacuum chamber when vacuumizing alone is to be performed, and which close said communication when gassing is to be included, said section being taken on the line 5—5 on Figure 6.
Figure 9:
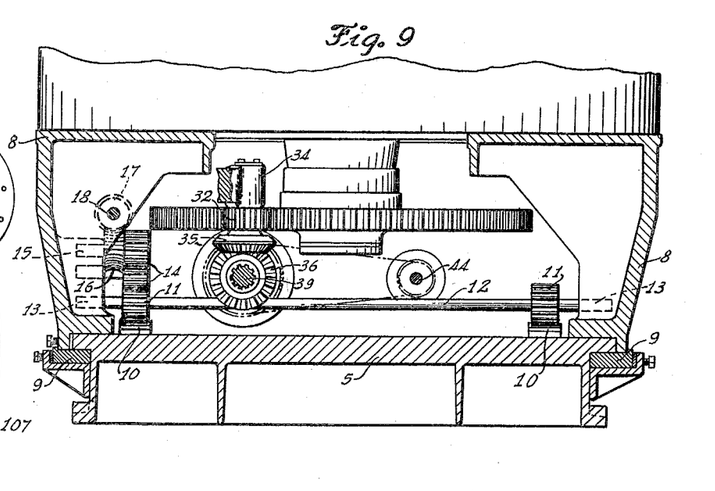
Figure 9 is a fragmentary vertical cross sectional view illustrating the slide mounting of the valve-like vacuumizing apparatus on its supporting base.

In the operation of the apparatus for vacuumizing and closing containers, the low and high vacuum ducts 127 and 129 are connected with the individual vacuum sources, each preferably comprising a rotary pump capable of exhausting the air at the rate of 250 cubic feet a minute. In this set-up the wall plugs 132 illustrated in Figures 5 and 6 are removed so as to open communication between the high vacuum chamber 128 and the interior of the closing machine casing 6. It should be apparent that under these operative conditions, it would be possible, if desired, to directly connect the closing apparatus casing 6 with the high vacuum source pump through the duct 130 instead of the previously mentioned duct 129. This is a matter of option however.

With the drive connections previously described in operating condition, the turret 89 and the closing device 91 would be in operation, rotation would be imparted to the rotor 47 and the several can feeding and transferring devices would function to feed filled cans into the rotor pockets, from the rotor pockets to the turret, from the turret back into the rotor pockets, and from the rotor pockets onto the feed-away devices as previously described. The individual ports 100 associated with the vacuumizing ducts 102 leading into the individual pockets would traverse the arc of orifices arranged as in Figure 10 maintaining constant communication between the vacuum sources, first through the low stage and then through the second stage, except at the break occurring at the partition wall 109, and the evacuation of the individual pockets would proceed at a rate such as will maintain a constant drag on the coffee always closely approximating but less than that sufficient to lift coffee fines out of the can. It has been found that by the time a given port 100 has traversed all the orifices of the first stage arc within the chamber 110 twenty-eight to twenty-eight and one-half inches of vacuum will have been drawn in the associated chamber or pocket 64, and during the traversing of the remaining orifices in the second stage arc associated with the high vacuum chamber 112 a vacuum of 29.8 inches will have been drawn in the pocket and the can therein. The cans thus vacuumized are transferred into the closing apparatus by the star 78 and are closed by the device 91, and then are returned to the rotor pockets 64 by the transfer star 81, after which they are removed from said pockets by the transfer star 86 and fed away by the devices generally designated H.

Figure 13:
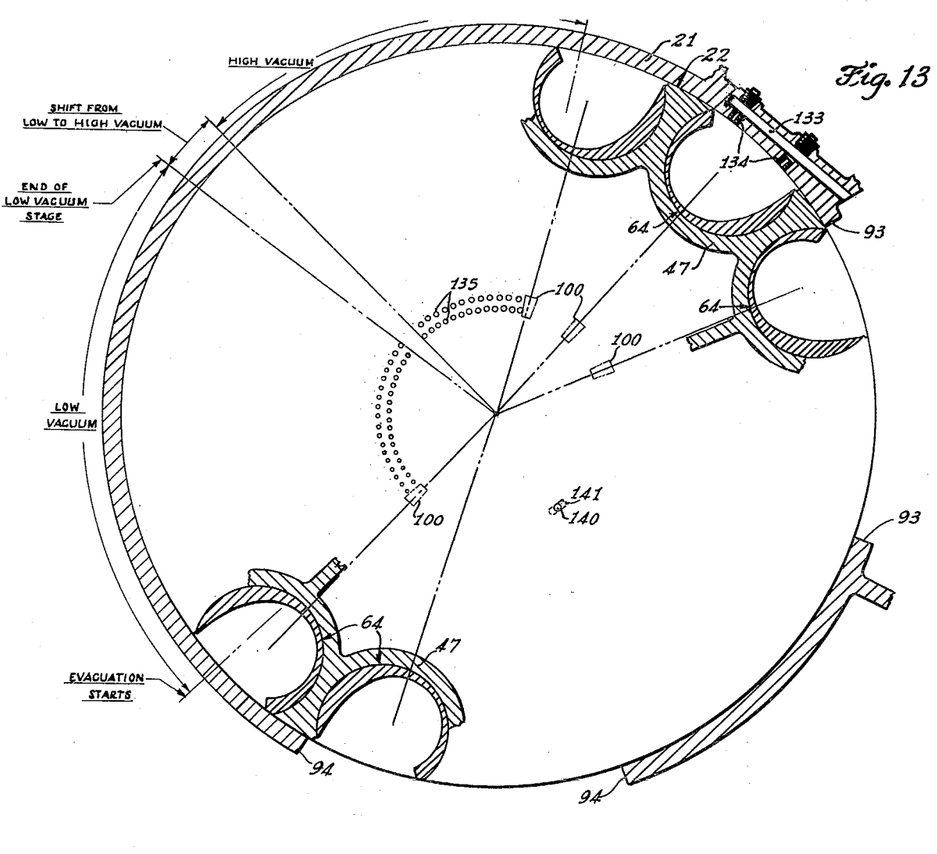
Figure 13 is a diagrammatic sectional view illustrating an arrangement of ports and ducts effective for vacuumizing and gassing, several of the vacuumizing pockets being illustrated in section, and one pocket being shown as passing and receiving gas from the two gassing ducts prior to the opening of the pocket into the closing apparatus.

When it is desired to both vacuumize and gas the containers prior to closing the same the closure plugs 132 are mounted in the division wall 131 as shown in Figures 5 and 6 so as to isolate the high vacuum chamber 128 from the interior of the closing apparatus casing 6. The inert gas, for example nitrogen at one or two pounds gage pressure, will now be introduced into the closing apparatus casing through the duct 130. With the apparatus thus conditioned for vacuumizing, gassing and closing, there may be employed an orifice plate modified somewhat as illustrated in Figure 13, the terminal point of the two-stage arc of orifices being shifted counterclockwise to assure that the vacuumizing orifices will terminate so as not to have communication through the rotor pockets with the casing gas duct 133 and its radial openings 134.

The vacuumizing of the cans now takes place as previously described, but as each pocket 64 comes opposite the duct 133 and its two radial inward extensions 134 the inert gas will be introduced into said pocket before it reaches the casing opening 94, or in other words, before it opens into communication with the interior of the casing 6 of the closing apparatus. It will be apparent by reference to Figures 1 and 13 that the extensions 134 are so placed that both may direct gas into a single pocket simultaneously. This introduction of gas into the pockets before they reach the opening 94 renders less abrupt the pressure transition between the fully vacuumized condition and the full gassing condition which pertains after the pockets open into the closing apparatus interior. Figure 13 illustrates clearly where the low vacuum evacuating starts and finishes and also where the high vacuum evacuation starts and finishes.

It will be apparent from the foregoing that each of the vacuumizing chamber communicating ports 100 progressively communicates over vacuumizing orifice unit areas of gradually and progressively increasing sizes in bringing about the desired vacuumizing of the pockets and the cans therein without danger of drawing pulverulent material from the cans. By "unit orifice area" is meant the total orifice area uncovered by a port at any stage on the vacuumizing cycle whether it be composed of a single orifice round or otherwise shaped or a multiple of such orifices aggregating the predetermined area which will permit the velocity of the outrushing air to increase as the density of the air in the can and pocket decreases, thereby to carry out the vacuumizing cycle with respect to each can at a rate always closely approximating but less than that which would be effective to lift material from the can.

By reason of the provision of the herein described multi-orifice valve arrangement all of the difficulties experienced in presently known machines brought about by successive abrupt communication with spaced orifices, or the intercommunication of pockets which takes place when a multiple of pockets communicate simultaneously through an elongated vacuumizing groove are eliminated. In the herein described equipment the vacuumizing pockets constantly communicate with a multiple of vacuumizing orifices and yet each pocket or chamber is connected separately and successively with the evacuating source through orifices properly sized so as to give a predetermined definite rate of flow through each orifice. By this means the vacuum source pump effective at the particular stage of the vacuumizing cycle is at all times handling a fixed amount of air coming from the combined orifices connected therewith. This condition creates a fixed and non-fluctuating vacuum in the chambers 110 and 112. Thus a flow from one rotor pocket is in no way affected by that from another rotor pocket or from a new communication of an oncoming pocket as the fixed vacuum will always create a predetermined outward flow through each orifice and no vacuum fluctuations will take place in the pockets.

Attention is directed to Figure 2 from which it will be apparent that, that portion of the rotor casing 21 which surrounds the rotor 47 between the opening 94 through which cans are transferred from the turret 89 to the rotor and the opening 93 through which cans are fed out of the rotor extends a distance sufficient to cover at least two complete pockets 64, and the rotor circumference land which separates said two pockets and at least portions of the rotor circumference lands which separate said two pockets from the adjacent pockets. This arrangement is of great importance in conjunction with the sealing ring means which surround the rotor above and below the pockets, especially when the machine is being used for vacuumizing and closing cans because air at atmospheric pressure tending to enter the closing chamber through the casing opening 93 between the upper and lower ring means and about the rotor within said casing portion must always pass through a rotor and casing clearance arc equivalent to at least two complete rotor circumference land portions between the upper and lower sealing ring means and composed of two complete lands or one complete land and varying portions of two additional land aggregating one land area.

Under these circumstances each pocket 64 travelling toward the casing opening 93 remains evacuated, and it requires so much time for the air leaking past the land portions and lands to enter the successively presented pockets and replace the vacuum therein that there is never time to build up sufficient pressure in the pocket nearest the casing opening 94 to leak past the final land or land portion into the closing chamber. In this manner entrance of excess air through the casing opening 93 and into the closing chamber is held to a minimum.

While examples of the form of the invention have been shown for purposes of illustration, it is to be clearly understood that various changes in the details of construction and arrangement of parts may be made without departing from the spirit and scope of the invention as defined in the appended claims.

I claim:

1. In apparatus of the character described, a vacuumizing apparatus including a casing and a peripherally pocketed rotor and means for drawing a vacuum in the rotor pockets and including a vacuum chamber formed in said casing, a closing apparatus including a casing providing a closing chamber, a rotary turret and means for closing cans in said closing chamber, means for transferring cans from the rotor pockets to the turret pockets, means for transferring closed cans from the turret pockets back into the rotor pockets, means for feeding filled cans into the rotor pockets, means for feeding closed cans out of the rotor pockets, means providing direct communication between the vacuum chamber and the closing chamber, means for directing an inert gas into the closing chamber, and means for closing off said direct communication between the closing chamber and the vacuum chamber, thereby to render the apparatus as a whole optionally adaptable for vacuumizing and closing cans or for vacuumizing, gassing and closing cans.

2. Apparatus as defined in claim 1 in which the casing of the vacuumizing apparatus also includes a gas duct communicating with the interior of the closing apparatus casing and having at least one radially inwardly directed portion so disposed as to be adapted to direct gas into a rotor pocket after completion of the vacuumizing thereof and before it opens into communication with the closing chamber in the interior of the closing apparatus casing.

3. In apparatus of the character described, a casing, a peripherally pocketed rotor rotatable in said casing, means for vacuumizing filled cans in the pockets of said rotor, a closing apparatus including a casing having a closing chamber into which the cans are delivered from the rotor, means for directing an inert gas into said closing chamber to be received in the cans before they are closed, and a duct in the first mentioned casing communicating with the interior of the closing chamber and having at least one radially inwardly directed portion so disposed as to be adapted to direct gas into each serially presented rotor pocket after completion of the vacuumizing thereof and before it opens into communication with the closing chamber.

4. In apparatus of the character described a casing having a frusto-coniform chamber therein, a peripherally pocketed rotor rotatably mounted in said chamber, means for delivering cans into and from the rotor pockets, means for vacuumizing the cans within the rotor pockets, and sealing ring means both above and below the rotor pockets between the opposing rotor and casing walls and each comprising a receiving groove formed in the periphery of the rotor, and a sealing ring equipment in each groove including multiple metal ring sections split and lapped at their ends, aperture and pin means securing the sections within the groove while permitting limited floating movement, and means backing up and sealing each split and lapped portion and including a seal shoe closing over said split and lapped portion, a metal carrier for the shoe, and a spring follower yieldably pressing the shoe against the split and lapped portion.

5. In a vacuumizing apparatus of the character described, a casing, a rotor rotatable in the casing and having peripheral pockets and a top portion, a valve plate mounted on said top portion and rotatable with the rotor, an orifice plate resting on the valve plate and having an arc of orifices therethrough communicating with a vacuum source, a pocket vacuumizing duct leading radially from each pocket and opening through a port in the valve plate disposed to traverse the arc of orifices, said orifices being progressively and gradually increased in size in the direction of rotation of the rotor, and said ports being of constant like sizes and so related to the orifices that each port will constantly be in communication between the vacuum source and the respective pocket through a plurality of the orifices throughout the whole of the vacuumizing cycle.

6. In a vacuumizing apparatus of the character described, a casing, a rotor rotatable in the casing and having peripheral pockets and a top portion, a valve plate mounted on said top portion and rotatable with the rotor, an orifice plate resting on the valve plate and having an arc of orifices therethrough communicating with a low vacuum source, said orifice plate also having a second arc of orifices therethrough isolated from the first mentioned arc and communicating with a high vacuum source, a pocket vacuumizing duct leading radially from each pocket and opening through a port in the valve plate disposed to traverse the arcs of orifices, said orifices in each said arc being progressively and gradually increased in size in the direction of rotation of the rotor, and said ports being of constant like sizes and so related to the orifices that each port while passing over the arcs of orifices will constantly be in communication between the vacuum source and the respective pocket through a plurality of the orifices throughout the whole of the low and high vacuumizing stages of the vacuumizing cycle.

7. Apparatus as defined in claim 5 in which the casing has a vacuum chamber therein through which the communication of the orifice plate is made through a slide tube surrounded by a sylphon bellows sealed at its ends against the orifice plate and the casing to prevent leakage about the slide tube incidental to any floating movement of the orifice plate, and there is included spring means constantly urging the orifice plate into snug surface contact with the valve plate.

8. In a vacuumizing apparatus of the character described, a casing, a rotor rotatable in the casing and having peripheral pockets, and means for vacuumizing filled cans in said pockets and comprising a vacuum source and valve means including a valve stator portion communicating with the vacuum source through a chamber and having an arc of orifices opening into the chamber, a valve rotor portion rotatable with the rotor and having ports therethrough of like constant size disposed to traverse the orifices of the arc serially and each being connected through a duct with one of the rotor pockets, the smallest orifice in the arc being so dimensioned as to control evacuation of each pocket therethrough at such a rate that the velocity of the outrushing air will closely approximate but not equal that velocity which would be effective to lift material from a can in the pocket, and the remaining orifices of the arc being progressively and gradually increased in size in the direction of rotation of the rotor and in degree so related to the vacuum existing in the vacuum source to the speed of rotation of the rotor and to the pocket and can sizes as to permit the velocity of the outrushing air to increase as the density of the air in the can and pocket decreases, thereby to carry out the vacuumizing cycle with respect to each can at a rate always closely approximating but less than that which would be effective to lift material from the can.

9. Apparatus as defined in claim 8 in which the arc of orifices is arranged in two sections successively traversed by the rotor ports and each section communicating with a separate chamber, said chambers being isolated one from the other and one connected with a low vacuum source and the other with a high vacuum source.

10. Apparatus as defined in claim 8 in which the arc of orifices is composed of two concentric arcs of orifices with the orifices in staggered relation so that an orifice in one arc will lie centered with respect to two orifices in the other arc and each of the ports is so dimensioned that while passing over the arcs of orifices it will simultaneously communicate over two complete orifice areas composed of two complete orifices or one complete orifice and parts of two adjacent orifices.

11. Apparatus as defined in claim 5 in which the arc of orifices is composed of two concentric arcs of orifices with the orifices in staggered relation so that an orifice in one arc will lie centered with respect to two orifices in the other arc and each of the ports is so dimensioned that while passing over the arcs of orifices it will simultaneously communicate over two complete orifice areas composed of two complete orifices or one complete orifice and parts of two adjacent orifices.

12. Apparatus as defined in claim 8 in which the arc of orifices is arranged in two sections successively traversed by the rotor ports and each section communicating with a separate chamber, said chambers being isolated one from the other and one connected with a low vacuum source and the other with a high vacuum source, and each said arc section of orifices being composed of two concentric arcs of orifices with the orifices in staggered relation so that an orifice in one arc will lie centered with respect to two orifices in the other arc, and each of the ports being so dimensioned that while passing over the arcs of orifices it will simultaneously communicate over two complete orifice areas composed of two whole orifices or one whole orifice and parts of two adjacent orifices.

13. Apparatus as defined in claim 6 in which the orifice area covered by a single port at any given time will be so related to the vacuum existing in the vacuum sources to the speed of rotation of the rotor and to the pocket and can sizes as to maintain the predetermined rate of evacuation always closely approximating but less than that which would be effective to lift material from the can.

14. In a vacuumizing apparatus of the character described, a peripherally pocketed rotor, means for evacuating the pockets as the rotor is rotated and including a duct leading into each pocket and opening from the rotor through a vacuumizing valve port, an orifice plate having an arc of orifices therethrough effective to control evacuation of the pockets by connecting the pockets with a vacuum source through said ducts, ports and orifices, said ports being disposed to traverse the orifices as the rotor rotates, a screen in each duct for catching any pulverulent drawn from a pocket, an air duct formed in the orifice plate away from the arc of orifices and being open to a source of air pressure and disposed to serially communicate with the vacuumizing ducts for directing a blast of air against the screens therein for clearing the screens of any pulverulent material which may have collected thereagainst.

15. In a vacuumizing apparatus of the character described, a peripherally pocketed rotor, means for evacuating the pockets as the rotor is rotated and including a duct leading into each pocket and opening from the rotor through a vacuumizing valve port, an orifice plate having an arc of orifices therethrough effective to control evacuation of the pockets by connecting the pockets with a vacuum source through said ducts, ports and orifices, said ports being disposed to traverse the orifices as the rotor rotates, said orifice plate having an annular tester groove extending 360° thereabout and including a tester gage receiving tap connection, an individual tester duct connecting with each pocket vacuumizing duct and having a portion disposed to continuously communicate with the tester groove, and a valve in each tester duct, said valves being operable to selectively and individually connect the pockets with the tester groove and tap connection to permit individual testing of operating conditions in the pockets.

16. Apparatus as defined in claim 6 in which each arc of orifices is composed of two concentric arcs of orifices with the orifices in staggered relation so that an orifice in one concentric arc will be centered with respect to two orifices in the other concentric arc, and each of the ports is so dimensioned that while passing over the arcs of orifices it will simultaneously communicate over two complete orifice areas composed of two whole orifices or one whole orifice and parts of two adjacent orifices, and in which the orifice area covered by a single port at any given time will be so related to the vacuum existing in the vacuum sources to the speed of rotation of the rotor and to the pocket and can sizes as to maintain the predetermined rate of evacuation always closely approximating but less than that which would be effective to lift material from the can.

17. Apparatus as defined in claim 8 in which the arc of orifices is composed of at least two arcs of staggered orifices and each of the ports is so dimensioned that while passing over the arc of orifices it will simultaneously communicate over two complete orifice areas composed of two complete orifices or one complete orifice and parts of two adjacent orifices.

18. Apparatus as defined in claim 8 in which the arc of orifices is composed of at least two arcs of orifices and each of the ports is so dimensioned that while passing over the arc of orifices it will simultaneously communicate over a total predetermined unit orifice area always greater than the unit orifice area next preceding and less than the unit orifice area next succeeding and being composed of one or more complete orifices or one or more complete orifices and parts of adjacent orifices aggregating said unit orifice area.

RALPH M. MERO.

REFERENCES CITED

The following references are of record in the file of this patent:

UNITED STATES PATENTS

| Number | Name | Date |
|---|---|---|
| 1,643,990 | Malmquist | Oct. 4, 1927 |
| 1,751,643 | Malmquist | Mar. 25, 1930 |
| 1,846,120 | Kronquest | Feb. 23, 1932 |
| 1,888,133 | Kronquest | Nov. 15, 1932 |
| 1,983,252 | Troyer | Dec. 4, 1934 |
| 2,018,113 | Bardet et al. | Oct. 22, 1935 |
| 2,064,678 | Morgan | Dec. 15, 1936 |
| 2,170,469 | Carter | Aug. 22, 1939 |
| 2,240,655 | Kronquest | May 6, 1941 |
| 2,283,181 | Cabot | May 19, 1942 |
| 2,340,341 | O'Brien | Feb. 1, 1944 |